United States Patent [19]

Stachowicz

[11] 4,426,848
[45] Jan. 24, 1984

[54] TURBOCHARGED ENGINE EXHAUST GAS RECIRCULATION SYSTEM

[75] Inventor: Robert W. Stachowicz, New Berlin, Wis.

[73] Assignee: Dresser Industries, Inc., Dallas, Tex.

[21] Appl. No.: 323,167

[22] Filed: Nov. 20, 1981

[51] Int. Cl.³ .................... F02B 37/00; F02M 25/06
[52] U.S. Cl. .................................... 60/605; 60/606; 123/568
[58] Field of Search ............... 60/605, 606; 123/568, 123/569, 570, 571

[56] References Cited

U.S. PATENT DOCUMENTS

| | | | |
|---|---|---|---|
| 3,149,454 | 9/1964 | Hahn | 60/605 X |
| 3,915,133 | 10/1975 | Nohira | 123/570 |
| 4,235,207 | 11/1980 | Nishimura | 123/568 |
| 4,328,672 | 5/1982 | Zumstein | 60/606 |
| 4,350,013 | 9/1982 | Yoshiba | 60/605 |

Primary Examiner—Michael Koczo
Assistant Examiner—Peggy A. Neils
Attorney, Agent, or Firm—Roy L. Van Winkle

[57] ABSTRACT

Improved exhaust gas recirculation systems for turbocharged gas engines that include an exhaust pipe, a turbocharger connected thereto, and a carburetor connected with a source of gas for the engine. The recirculation system includes an air conduit extending from the turbocharger compressor discharge to a venturi, an exhaust gas conduit that extends from a connection with the exhaust pipe between the engine and the turbocharger to the venturi, a second air conduit that extends from the exhaust pipe to a connection with the first air conduit, and control valves located in the exhaust gas conduit and in the second air conduit. The valves are closed when the engine is being started or idling at no load and open when a load is imposed or when engine rpm's are increased. No pumps, blowers, etc. are needed because the system operates on a differential in pressure created within the system to cause the exhaust gas recirculation.

8 Claims, 3 Drawing Figures

TURBOCHARGED ENGINE EXHAUST GAS RECIRCULATION SYSTEM

BACKGROUND OF THE INVENTION

This invention relates generally to turbocharged gaseous fueled internal combustion engines. More particularly, but not by way of limitation, this invention relates to an improved exhaust gas recirculation system for a turbocharged gas engine for the purpose of reducing the emission of nitrogen oxides during combustion.

Many solutions have been offered to the problem of excessive nitrogen oxides in the exhaust gas of internal combustion engines. Among other solutions, it has been proposed that the recirculation of a portion of the exhaust gas into the combustion air will reduce nitrogen oxides and it has been proven that exhaust gas recirculation does in fact reduce nitrogen oxides. Many types of recirculation systems have been proposed for introducing a portion of the exhaust gas into the combustion air.

For example, U.S. Pat. No. 3,774,399 issued Nov. 27, 1973 to Hidetaka Nohira et al, describes a turbocharged internal combustion engine that is provided with an exhaust gas recirculation system. U.S. Pat. No. 3,672,340 issued June 27, 1972 to Georg A. Bomba describes an exhaust gas recirculation system for naturally aspirated internal combustion engines.

Many different types of recirculation systems have been proposed for exhaust gases and most are effective to some extent. Most of the systems require the use of some form of pump or blower to circulate the exhaust gas. Naturally, such auxiliary devices require the utilization of part of the engine horsepower and thus reduce the overall efficiency of the engine.

It is an object of this invention to provide an exhaust gas recirculation system for a turbocharged gaseous fuel engine that is very efficient and has low power requirements since the recirculation of the exhaust gas is accomplished by a differential pressure created within the system.

SUMMARY OF THE INVENTION

This invention provides an improved exhaust gas recirculation system for turbocharged gas engines that include an exhaust gas pipe, an exhaust driven turbocharger connected to the exhaust pipe, and a gaseous fuel supply connected to the carburetor for the engine. The recirculation system includes an exhaust conduit connected to the exhaust pipe, a first air conduit connected to the turbocharger, a venturi connected with the exhaust and first air conduit and with the engine carburetor, and a second air conduit that connects the first air conduit with the exhaust pipe for increasing the pressure in the exhaust pipe to a level approximately equal to the pressure in conduit 36. The system also includes a first valve that is located in the exhaust conduit and a second valve that is located in the second air conduit. Valve control means connected with both the valves is provided for opening the valves when the engine is operating at more than idle speed or loaded and for permitting the valve to close during starting and idling of the engine.

BRIEF DESCRIPTION OF THE DRAWING

The foregoing and additional objects and advantages of the invention will become more apparent as the following detailed description is read in conjunction with the accompanying drawing, wherein like reference characters denote like parts in all views and wherein.

DETAILED DESCRIPTION OF THE PREFERRED EMBODIMENT

Figure 1:
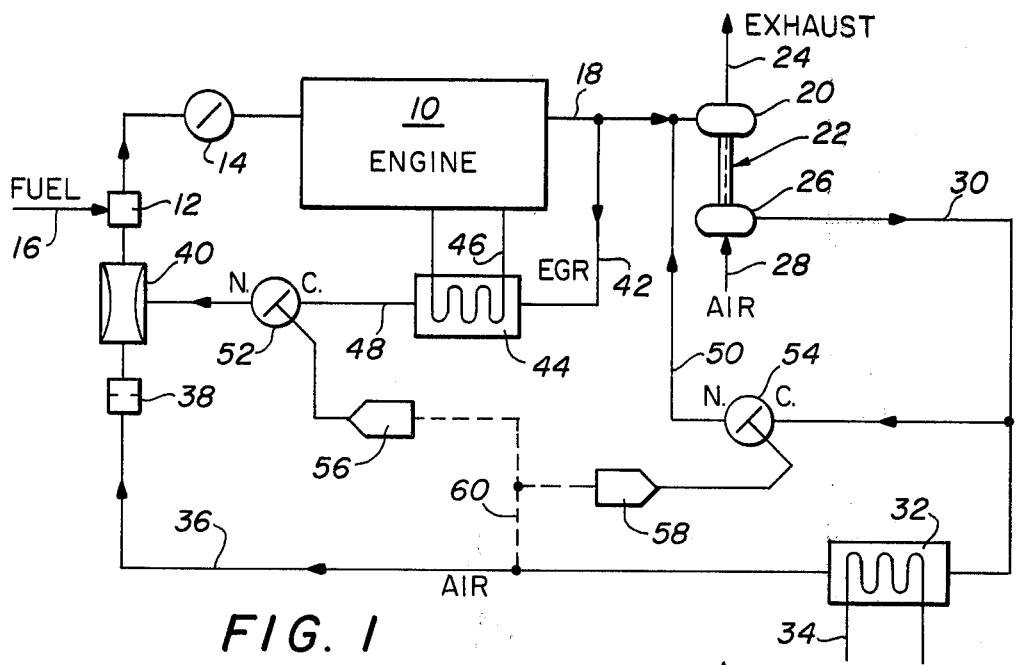
FIG. 1 is an schematic view of the preferred embodiment of an exhaust gas recirculation system constructed in accordance with the invention.

Referring to the drawing and to FIG. 1 in particular, shown therein is an engine 10 that includes a carburetor 12 and a throttle valve 14. The carburetor is provided for mixing fuel from a fuel supply 16 with air in a combustable ratio and the valve 14 functions to meter such mixture into the engine 10. The engine 10 also includes an exhaust pipe 18 that is connected to an exhaust turbine 20 which comprises part of turbocharger generally designated by the reference character 22. The gas outlet from the turbine 20 is an exhaust pipe 24. Although not shown, the exhaust pipe 24 may be connected to a catalytic converter or other device for purifying the exhaust gas.

The turbocharger 22 also includes an air compressor 26 that is driven by the exhaust turbine 20. The air compressor 26 includes an inlet 28 and an outlet or air conduit 30 that is connected with a heat exchanger 32. The heat exchanger 32 may be one of any of several conventional types, preferably one that uses water from the engine cooling system. The water flows through the heat exchanger 32 via the water pipe 34.

The heat exchanger 32 is connected with the carburetor 12 by an air pipe or conduit 36. Operably disposed in the conduit 36 is an orifice 38 and between the orifice 38 and the carburetor 12 is a venturi 40. The purpose of the orifice 38 and the venturi 40 is to provide a differential in pressure in the system for the purpose of inducing exhaust gas flow as described hereinafter.

Connected with the exhaust pipe 18 is an exhaust gas conduit 42 that is also connected with a heat exchanger 44. The heat exchanger 44 is of conventional type and is connected into the engine water cooling system by a pipe 46. The outlet from the heat exchanger 44 is connected by an exhaust gas conduit 48 to the throat of the venturi 40 so that air flowing through the air conduit 36 and the venturi 40 will enduce the flow of exhaust gas into the venturi 40.

A by-pass conduit 50 is connected with the air conduit 30 between the compressor 26 and heat exchanger 32 and is connected at its opposite end to the exhaust pipe 18 between the exhaust conduit 42 and the turbine 20.

A normally closed, control valve 52 is located in the exhaust conduit 48 between the heat exchanger and the venturi 40. A second, normally closed, control valve 54 is located in the air by-pass conduit 50. Each of the valves 52 and 54 remains closed during idling or starting of the engine 10. A valve actuator 56 and a valve actuator 58 are connected with the valves 52 and 54 respectively, and each is connected by a sensing line or pipe 60 with the air conduit 36. The actuators 56 and 58 are arranged so that when the air pressure in the conduit 36 reaches a pre-determined value, such as 1½ psi, the valve 52 and 54 will be opened by the actuators 56 and 58 permitting exhaust gas flow through the conduits 42 and 48 to the venturi 40 and air flow between conduit 30 and exhaust pipe 18.

Operation of the Preferred Embodiment

As previously mentioned, the valves 52 and 54 are normally closed and are closed during starting and idling of the engine 10. Accordingly, the valves 52 and 54 are in the closed position when the engine 10 is started, and no exhaust gas is recirculated from the exhaust pipe 18 into the fuel system.

Increasing the engine speed until it is sufficient to cause the air in the conduit 36 to reach the pre-determined pressure, causes the actuators 56 and 58 to open the valves 52 and 54. The opening of the valve 54 causes a portion of the air in the conduit 30 to be recirculated through the conduit 50 into the exhaust pipe 18 to increase the pressure in the exhaust pipe 18. Such increase causes the increase in flow of the exhaust gas through the conduit 42, the heat exchanger 44 and the conduit 48 into the venturi 40 through the now open valve 52.

The venturi 40 and the orifice 38 may be used in combination or only venturi 40 can be used to further enhance the differential in pressure between the exhaust conduit 48 and the air conduit 36 to induce the flow of exhaust gas into the venturi 40. Air in the conduit 36 and the exhaust gas entering the venturi 40 through the conduit 48 mix and then flow into the carburetor 12. In the carburetor 12 they are then mixed in the desired combustible ratio with gaseous fuel. The throttling valve 14 controls the quantity of mixture that is supplied to the engine 10. In the type of the stationary engines in which this system is used, the throttling valve 14 is usually controlled by an engine governor (not shown).

Figure 2:
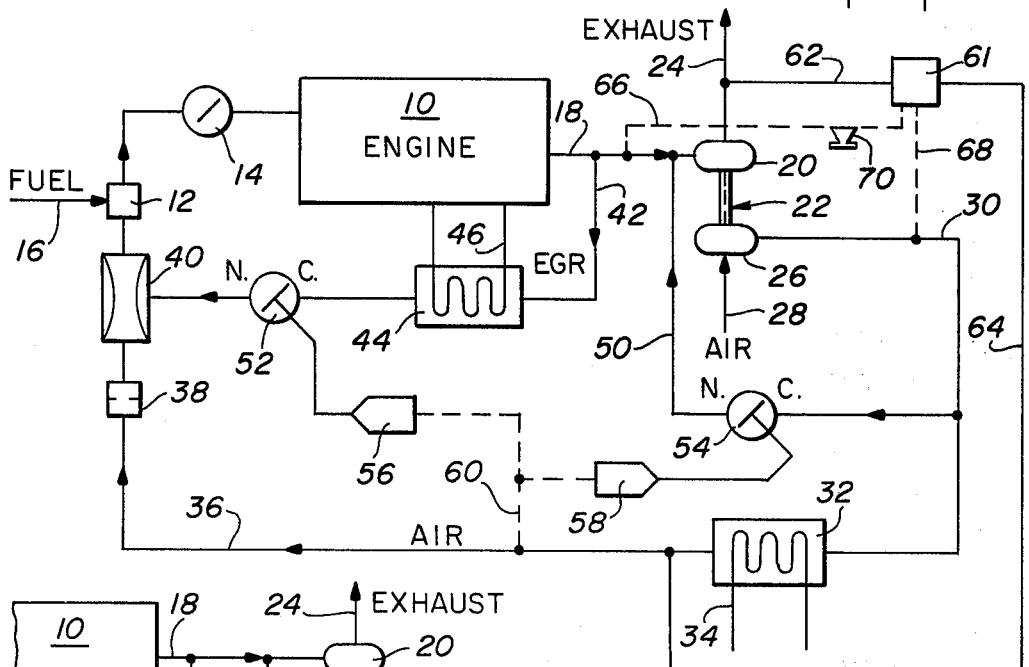
FIG. 2 is an schematic diagram of another embodiment of exhaust gas recirculation system that is also constructed in accordance with the invention.

Description of the Embodiment of FIG. 2

Throughout FIG. 2, the same reference characters have been utilized to designate the same parts as previously described in connection with FIG. 1. It will be noted in FIG. 2 that the circuit of the exhaust recirculation system is essentially the same, but has been made somewhat more sophisticated as will be described.

As shown in FIG. 2, a proportional control valve 61 is connected to the exhaust pipe 24 by a conduit 62 and to the air conduit 36 by a conduit 64. Sensing lines or pipes 66 and 68 connect the proportional control valve 61 with the exhaust pipe 18 and with the air conduit 30 respectively. A water trap and bleed valve 70 is located in the sensing pipe 66 to permit any condensation that may occur therein to be drained.

In the embodiment of FIG. 2, the proportional control valve 61 can be adjusted so that it will open when the ratio between the pressure in the exhaust pipe 18 and the pressure in the conduit 30 reaches a pre-determined value. When the valve 61 opens, air from the conduit 36 is discharged through the conduit 64, through the proportional control valve 61 and conduit 62 to the exhaust pipe 24. Accordingly, the ratio of pressures between the air conduit 36 and the exhaust gas recirculation conduit 42 are affected and controlled by the proportional control valve 61 to further refine the ability of the system to control the differential which promotes the exhaust gas recirculation to the engine 10.

Figure 3:
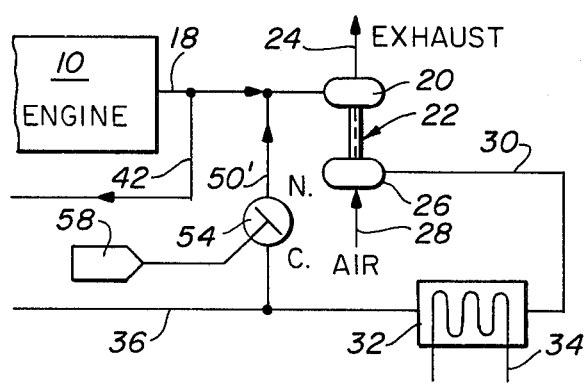
FIG. 3 is a fragmentary schematic drawing of a portion of the apparatus showing a modification thereto that is also constructed in accordance with the invention.

Description of the Modification of FIG. 3

As in FIG. 2, the same reference characters have been utilized in FIG. 3 to designate the same parts previously described in connection with FIGS. 1 and 2. The modification of FIG. 3 can be utilized either in the recirculation system embodiments of FIGS. 1 or 2.

In FIG. 3, an air by-pass conduit 50' extends from the conduit 36 to the exhaust pipe 18. Thus, the by-pass air conduit 50' is delivering cooler air through the control valve 54 to the exhaust pipe 18 since the connection of that pipe is made down stream of the heat exchanger 32 instead of upstream as in FIGS. 1 and 2.

It should be pointed out that in all the embodiments, the by-pass air conduit 50 or 50' functions to increase the pressure in the exhaust pipe 18 without significantly affecting the pressure of the air in the conduit 30 that is discharged by the compressor 26 of the turbocharger 22.

From the foregoing, it will be appreciated that the exhaust gas recirculation system as applied to turbocharged, gaseous fuel engines, has no moving parts with the exception of the control valves which simply open and close at the appropriate time to prevent the flow of exhaust gas in the system during the starting or idling of the engine. Otherwise, the system functions purely on pressure differentials created within the system by the use of proper line sizes, the venturi, and restrictions such as the orifice 38. Since no auxiliary blowers or pumps are necessary, the system is highly efficient in that it requires no power from the engine to provide the recirculation.

It should be pointed out that the foregoing detailed descriptions are presented by way of example only, and that many modifications and changes can be made thereto without departing from the spirit and scope of the invention.

The embodiments of the invention in which an exclusive property or privilege is claimed are defined as follows:

1. An improved exhaust gas recirculation system for turbocharged gaseous fuel engines including an exhaust gas pipe, an exhaust driven turbocharger connected to the exhaust pipe, and a gaseous fuel supply connected to a carburetor for the engine, the improvement comprising:
    exhaust conduit means connected to the exhaust pipe between the engine and turbocharger;
    first air conduit means connected to the turbocharger;
    venturi means connected with said exhaust and first air conduit means and with the engine carburetor;
    second air conduit means connecting said first air conduit means with the exhaust pipe for increasing the pressure in said exhaust pipe;
    first valve means located in said exhaust conduit means for controlling the flow of exhaust gas therethrough;
    second valve means located in said second air conduit for controlling the flow of air therethrough; and,
    valve control means connected with both said valve means for opening said valve means when the engine is operating at more than idle speed or when loaded and permitting said valve means to close during starting and idling of the engine.

2. The exhaust gas recirculation system of claim 1 and also including exhaust gas heat exchanger means located in said exhaust conduit means for cooling exhaust gas passing through said exhaust conduit means.

3. The exhaust gas recirculation system of claim 1 or 2 and also including air heat exchanger means located in said first air conduit means for cooling air passing through said first air conduit means.

4. The exhaust gas recirculation system of claim 1 wherein said valve control means includes:
   pressure sensing means for sensing the pressure in said first air conduit means; and
   valve actuation means actuated by said pressure sensing means when the pressure in said first air conduit reaches a pre-determined value for opening both said valve means to permit flow through said first and second air conduit means.

5. The exhaust gas recirculation system of claim 4, wherein both said valve means are biased toward the closed position preventing flow through said conduit means when unactuated by said valve actuation means.

6. The exhaust gas recirculation system of claim 3, wherein said air heat exchanger means is located between said venturi and the connection between said first and second air conduit means.

7. The exhaust gas recirculation system of claim 3 wherein said air heat exchanger means is between said turbocharger and the connection between said first and second air conduit means.

8. The exhaust gas recirculation system of claim 1 and also including:
   third air conduit means connecting said first air conduit means with the exhaust from said turbocharger;
   differential pressure responsive valve means located in said third air conduit means for controlling the flow of air from said first air conduit means to the turbocharger exhaust;
   air pressure sensing means for transmitting the pressure in said first air conduit means to said differential pressure responsive valve means; and
   exhaust pressure sensing means for transmitting the pressure in said exhaust gas pipe to said differential pressure responsive valve means, whereby said pressure responsive valve means opens to permit air flow from said first air conduit means to the turbocharger exhaust when the differential in pressure between said air pressure and exhaust pressure exceeds a predetermined value.

* * * * *